Oct. 9, 1956
F. E. HENDRICKSON
2,765,594
SURFACE-FINISHING WORK WHEEL
Filed Jan. 7, 1952
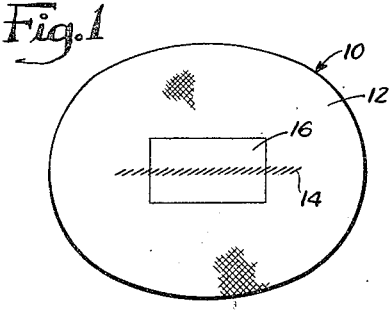
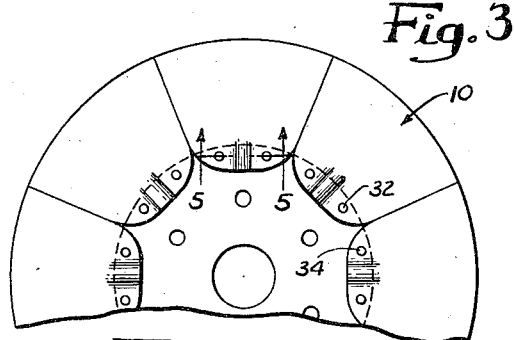
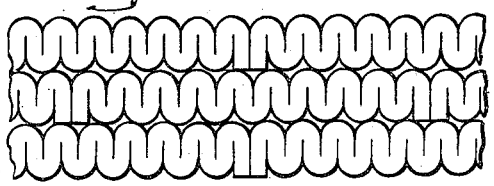
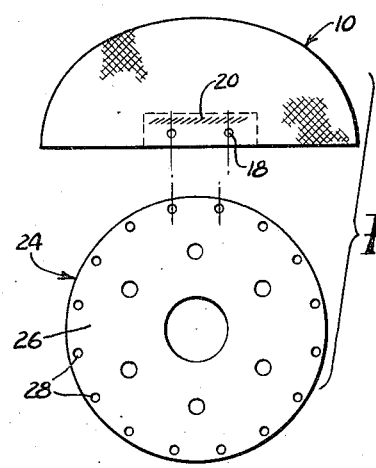
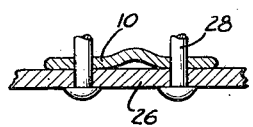
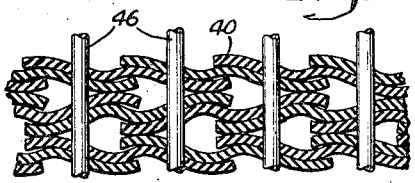
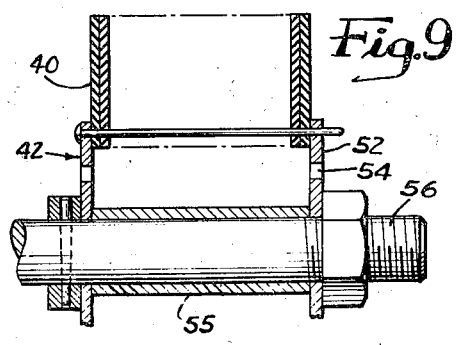
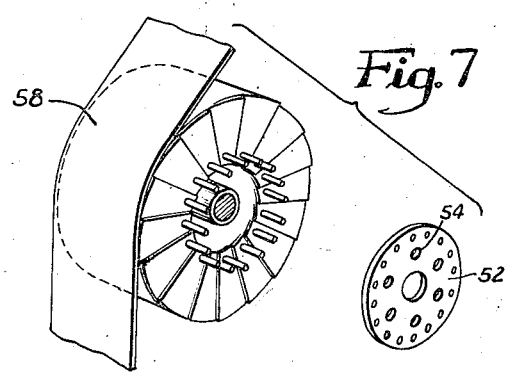
INVENTOR.
Fritz E. Hendrickson
BY
Karl W. Sommermeyer
Atty.

2,765,594
Patented Oct. 9, 1956

2,765,594
SURFACE-FINISHING WORK WHEEL

Fritz E. Hendrickson, South Elgin, Ill., assignor of one-half to Murray Ireland, Elgin, Ill.

Application January 7, 1952, Serial No. 265,350

6 Claims. (Cl. 51—193)

My invention relates to surface-finishing work wheels, including buffing wheels and belt-contact wheels. This application is a continuation in part of my co-pending application for Buffing Wheel, Ser. No. 748,085, filed May 14, 1947, on which Patent 2,581,411, issued January 8, 1952.

An object of my invention is to improve the construction and performance of work wheels in general, and sectional wheels in particular.

Another object includes the improvement of the distribution of the cloth in a buffing wheel having folded cloth sections, the provision of more cloth at the center part of the angular extent of a folded cloth section on such a wheel, and the reduction of the crowding of the cloth at the margins.

Other objects include the improvement of the belt-supporting ability of sectional contact wheels when running slowly; the provision of more structural stiffness of the sections so that they will support and retain the belt during starting and stopping; the provision of a stiffness that is primarily effective when the wheel is running slowly; the provision of moderate stiffness in inherently-flexible sections of a contact wheel; the provision of a kind of structural stiffness of the sections that is effective for supporting the belt alone but which substantially disappears when work is pressed into the belt; the provision of a stiffness that disappears when the section is deflected; and the provision of a belt-backing wheel that supports and retains the belt well during starting and stopping, but yet yields readily to the work.

In accordance with my invention, the plane of each radial section extends in a generally circumferential direction as in prior wheels, but also is curved to give it extra stiffness. This curved form may be provided, for example, by providing a pair of mounting holes in the section that are farther apart than the pair of hub pins on which it is mounted.

These and other objects and advantages will be apparent from the following description of certain specific embodiments of the invention which illustrate the manner in which it may be practiced. In the drawings:

Figure 1 is a view of a partially-completed, cloth "section" for a buffing wheel;

Fig. 2 is a view of a hub and a section constituting parts of a buffing wheel of my present invention;

Fig. 3 is a fragmentary elevational view of a buffing wheel made of the parts shown in Fig. 2;

Fig. 4 is a fragmentary plan view of the wheel of Fig. 3;

Fig. 5 is a partial section taken on the line 5—5 of Fig. 3;

Fig. 6 shows a "section" and hub of a belt-backing contact wheel of my present invention;

Fig. 7 is a pictorial view of a partially-assembled, contact wheel made of the parts of Fig. 6;

Fig. 8 is a fragmentary, developed view looking radially out from the interior of the wheel of Fig. 7 for showing one arrangement of the sections which has given good results; and Fig. 9 is a sectional view showing how the wheel of Fig. 7 is mounted.

As is shown in Fig. 1, a flat, sheet-like buff "section" 10 may be formed of a plurality of oval plies or pieces 12 of cotton cloth, for example from five to 10 of them, laid one on the other and sewed as at 14 for holding them together. A piece 16 of heavier cloth may be included for mechanical strength. This pad of cloth is then folded along the longer diameter of the oval as shown in Fig. 2, and a pair of mounting holes 18 punched through all layers. Further sewing, as at 20, may be provided for holding the section in its folded form. The resulting section is to be mounted on a hub or "pin-flange" 24 comprising a steel disc 26 and pins 28 spaced evenly about its edge. The spacings of the pins 28 and of the holes 18 are so chosen that the spacing of the holes is greater, as indicated by the dimension lines in Fig. 2.

Fig. 3 shows how several sections are mounted on successive pairs of pins for completing a course of sections about the hub. During operation of the wheel, centrifugal force will cause the cloth section to fold together bag-like, as shown here, and therefore the sections are spaced accordingly and are crowded into that form during assembly. For building up a wheel of sufficient axial length for a particular job, successive courses of sections may be laid on. Preferably the courses are staggered, as by putting a section of the second course on the two pins 32 and 34 in Fig. 3 and continuing around the hub so that each section bridges two sections in the course next to it.

The working face (the cylindrical surface) of the assembled wheel will show the cloth gathered or bunched in a zig-zag pattern. For simplicity, and for better indicating the staggered arrangement of the courses, the pattern of the folds of the cloth is shown in Fig. 4 as being simple and regular, but actually the folds are irregular and to some extent adjacent sections fold into each other.

The wide separation of the two mounting holes 18 in the cloth section causes the cloth to buckle in a hump, curve, or undulation between the mounting pins, as shown in the sectional view of Fig. 5, and as indicated to some extent by shading in Fig. 3. This arrangement tends to increase the quantity of cloth in the center of the section at the expense of its edges. Prior sectional wheels have tended to have more cloth at the edge of the section and so present more resistance to penetration by the work. While some such slight unevenness appears to be helpful for certain work in that it makes the wheel "cut" faster, nevertheless, the resulting "roughness" of the wheel against the work is undesirable, particularly for the final finishing. The concentration of cloth at the middle of the section, at the expense of the edges, helps to make the wheel "smoother." The buckling, or humping, of the section between the pins also tends to reduce the compactness of the assembly so that ventilating air which enters holes 30, flows through it radially outward more easily, and so that an assembled wheel of a given size has fewer sections and therefore less cloth, and so is "softer" to the work.

In Fig. 6 there are shown a section 40 and hub 42 for a so-called "contact wheel" for backing up an abrasive belt at the point at which work is applied to it. The section 40 may consist of a single piece of heavy canvas, leather, or other flexible material, cut to the shape shown. I prefer a laminate of rubber and canvas. The section 40 has a pair of mounting holes 44 spaced apart farther than the pair of pins 46 on the hub 42 on which it is to be mounted. These spacings are indicated by the dimension lines in Fig. 6.

A plurality of sections 40 are mounted on the pin-flange 42 in courses, the sections of each course overlapping as shown in Fig. 7. Preferably the direction of overlap of each course is opposite to that of the course next to it, as in Fig. 8 which shows a part of three successive courses. The buckled or curved configuration of the sections is caused by the wide spacing of holes 44 as compared to the pins 46. The curvature is not confined to the inner edge near the mounting pins, but extends well out toward the periphery of the wheel. This undulate form gives each piece 40 considerably more stiffness against radial forces than it would have if flat. Thus a force radially inward, such as is produced by a belt, loads the piece 40 as a column, and it is against this load that the curvature of the piece 40 is especially effective for producing stiffness. As is well known, the ability of a wheel to make a belt run on it, depends in part on the shape and alignment of the wheel. Accordingly the curvature is important for making the pieces 40 stiff enough to support the pressure of the belt and to enable the wheel to keep its shape and guide the belt. Ideally, the curvature of pieces 40 should be just enough to make the wheel capable of supporting and retaining the abrasive belt during the starting and stopping of the machine. At running speed, centrifugal force adds to the belt-supporting ability of the sections 40.

Like any column, the piece 40 will collapse if the force exerted becomes great enough, and in the collapsed position will show little stiffness. Similarly, the piece 40, even though curved, cannot resist much sidewise force (axial of the wheel) and when bent aside by such a force will lose much of its stiffness as a column. Accordingly, that part of the belt that is deflected into the wheel by the work (with the belt and wheel running at full speed) probably receives most of its support from centrifugal force.

As is shown in Fig. 9, the complete wheel, mounted for use, includes, in addition to the pin-flange 42 and sections 40, a cover flange 52, and tubular spacer 55, all bolted onto a shaft such as 56. An abrasive belt is run over the wheel, as shown in Fig. 7, abrasive side out. Work to be polished is applied to that part 58 of the belt that is in contact with the wheel. Preferably the belt is driven by one of the other pulleys which help support and guide it.

The invention is capable of modifications and variations within the scope of the claims.

I claim:

1. A belt-backing contact wheel for surface-finishing operations including in combination, a plurality of flexible sections each including a piece of heavy sheet material having a pair of mounting holes near one edge thereof, a wheel hub having circumferentially spaced members extending through said holes and supporting said flexible sections thereon with said one edge of each section innermost so that said sections extend out generally radial from said members and said hub, each section having two of said members in said holes whereby said section also extends circumferentially of said wheel, said two mounting holes in at least some of said sections being farther apart in the flat unmounted section than the spacing of the two members in said holes, whereby said sections must be undulate between said members when supported thereon and the undulation radially stiffens said sections, each of said sections extending through only a part of the circumference of said wheel, at least some of said sections partially overlapping sections next to it on said wheel, said sections being sufficiently flexible that in the operation of said wheel each said undulate section can be deflected enough to collapse its undulate shape for thereby relieving the radial stiffness and returned to said radial position and said undulate and radially stiffened shape.

2. The belt-backing contact wheel of claim 1 wherein at least some of said sections are laid in a course about the hub with the sections of the course partially overlappings adjacent sections thereof.

3. The belt-backing contact wheel of claim 1 wherein said piece of heavy sheet material is formed of canvas.

4. The belt-backing contact wheel of claim 1 wherein said piece of heavy sheet material is formed of a woven fabric.

5. The belt-backing contact wheel of claim 1 wherein said piece of heavy sheet material is formed of a laminate of rubber and canvas.

6. A composite work wheel for surface-finishing operations including in combination, a plurality of flexible sections each comprising a pad of cloth sheets, said pad being folded double so as to have a folded edge and having two mounting holes therethrough close to said folded edge and at substantially equal distances from said folded edge near the center thereof, a wheel hub having circumferentially-spaced members extending through said mounting holes and supporting said sections thereon with the folded edge of each pad innermost so that said pads and sections extend out generally radial from said members and said hub, each pad having two of said members in said holes whereby said pads also extend circumferentially of said hub, said two mounting holes in at least some of said pads being farther apart in the flat, unmounted pad than the spacing of the two members in said holes, whereby said pads and the sheets thereof must be undulate between said members when supported thereon, each of said pads extending through only a part of the circumference of said hub.

References Cited in the file of this patent

UNITED STATES PATENTS

| | | |
|---|---|---|
| D. 96,230 | Ecklund | July 16, 1935 |
| 735,632 | Webster | Aug. 4, 1903 |
| 1,223,816 | Manly | Apr. 24, 1917 |
| 2,068,029 | Klaff | Jan. 19, 1937 |
| 2,103,499 | Seifried | Dec. 28, 1937 |
| 2,140,208 | Murray | Dec. 13, 1938 |
| 2,226,624 | McFarland | Dec. 31, 1940 |
| 2,531,249 | Blair | Nov. 21, 1950 |
| 2,539,844 | Kingsbury | Jan. 30, 1951 |
| 2,556,966 | Hall | June 12, 1951 |
| 2,559,385 | Bahr | July 3, 1951 |
| 2,562,688 | Bahr | July 31, 1951 |
| 2,636,324 | Ruthven | Apr. 28, 1953 |